(12) United States Patent
Liou

(10) Patent No.: US 9,395,547 B2
(45) Date of Patent: Jul. 19, 2016

(54) 3-DIMENSIONAL IMAGE DISPLAY

(71) Applicant: Industrial Technology Research Institute, Hsinchu (TW)

(72) Inventor: Jian-Chiun Liou, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 584 days.

(21) Appl. No.: 13/890,270

(22) Filed: May 9, 2013

(65) Prior Publication Data

US 2013/0258460 A1    Oct. 3, 2013

Related U.S. Application Data

(60) Division of application No. 12/978,639, filed on Dec. 27, 2010, now abandoned, which is a continuation-in-part of application No. 11/536,691, filed on Sep. 29, 2006, now Pat. No. 7,885,079.

(30) Foreign Application Priority Data

Aug. 18, 2006   (TW) ................................ 95130365 A

(51) Int. Cl.
*H04N 7/18*    (2006.01)
*G02B 27/22*    (2006.01)
*H04N 13/04*    (2006.01)

(52) U.S. Cl.
CPC ........ *G02B 27/2214* (2013.01); *H04N 13/0404* (2013.01); *H04N 13/0409* (2013.01); *H04N 13/0497* (2013.01)

(58) Field of Classification Search
CPC .......... H04N 13/0497; H04N 13/0404; H04N 13/0409
USPC ...................................... 348/42–60
See application file for complete search history.

(56) References Cited

U.S. PATENT DOCUMENTS 7,466,485 B2 *  12/2008  Woodgate .......... G02B 27/2214
                                                        348/42

* cited by examiner

*Primary Examiner* — Andy Rao
(74) *Attorney, Agent, or Firm* — Jianq Chyun IP Office

(57) ABSTRACT

A 3-dimensional image display includes a display panel and a light deflecting lens array. The display panel is to display a sequence of images with actively emitting an image light. The images are corresponding to a plurality of viewing zones and sequentially displayed by a time sequence. The light deflecting lens array is disposed over the display panel. The light deflecting lens array has a plurality of light deflecting units, and the light deflecting units sequentially deflect the image light to the corresponding viewing zones by the same time sequence.

14 Claims, 20 Drawing Sheets

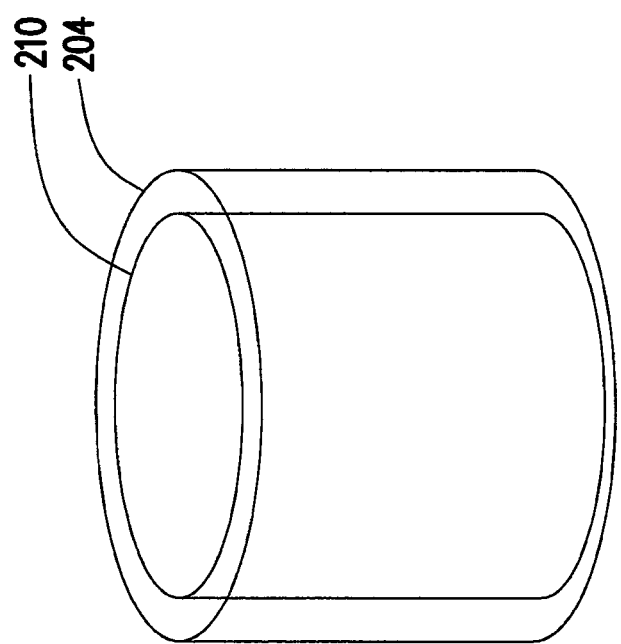

3-DIMENSIONAL IMAGE DISPLAY

CROSS-REFERENCE TO RELATED APPLICATION

This application is a divisional of and claims the priority benefit of U.S. application Ser. No. 12/978,639, filed on Dec. 27, 2010. The prior U.S. application Ser. No. 12/978,639 is a continuation-in-part application of and claims the priority benefit of U.S. application Ser. No. 11/536,691, filed on Sep. 29, 2006, now allowed. The prior U.S. application Ser. No. 11/536,691 claims the priority benefit of Taiwan application Ser. No. 95130365, filed on Aug. 18, 2006. The entirety of each of the above-mentioned patent applications is hereby incorporated by reference herein and made a part of specification.

BACKGROUND OF THE INVENTION

1. Technical Field

The present invention relates to an electronic assembly. More particularly, the present invention relates to a 3D-image display.

2. Background

Generally, a conventional circuit board for carrying and electrically connecting a plurality of electronic components is composed of a plurality of patterned conductive layers and a plurality of insulating layers stacked alternately. The patterned conductive layers may be formed of copper foils through lithography and etching processes, and the insulating layers are respectively disposed between the adjacent patterned conductive layers for isolating the patterned conductive layers. Besides, these overlapped patterned conductive layers are electrically connected to each other through conductive vias. Moreover, electronic components can be disposed on the surface of the circuit board so as to form an electronic assembly. The electronic components are electrically connected to the patterned conductive layer on the surface of the circuit board and electrical signal propagation is accomplished via the internal wiring of the circuit board.

For the application of image display, the image is displayed with 3D (3 dimension) visual effect has been proposed.

SUMMARY

In an embodiment, a 3-dimensional image display includes a backlight source, a light deflecting lens array, and a display panel. The light deflecting lens array is disposed over the backlight source. The light deflecting lens array has a plurality of light deflecting units, each of the light deflecting units deflects a portion of the backlight source into a plurality of viewing zones in a time sequence. The display panel, to display images by the same time sequence corresponding to the viewing zones. The backlight source passes through the display panel to provide the images respectively to the viewing zones.

In an embodiment, a 3-dimensional image display includes a display panel and a light deflecting lens array. The display panel is to display a sequence of images with actively emitting an image light. The images are corresponding to a plurality of viewing zones and sequentially displayed by a time sequence. The light deflecting lens array is disposed over the display panel. The light deflecting lens array has a plurality of light deflecting units, the light deflecting units sequentially deflect the image light to the corresponding viewing zones by the same time sequence.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9B is a drawing, schematically illustrating a mechanism for 3D image display, according to an embodiment of the disclosure.

DESCRIPTION OF DISCLOSED EMBODIMENTS

The flexible display can be based on the technology of flexible electronic assembly. Embodiment for the flexible electronic assembly is provided as follows.

Figure 1:
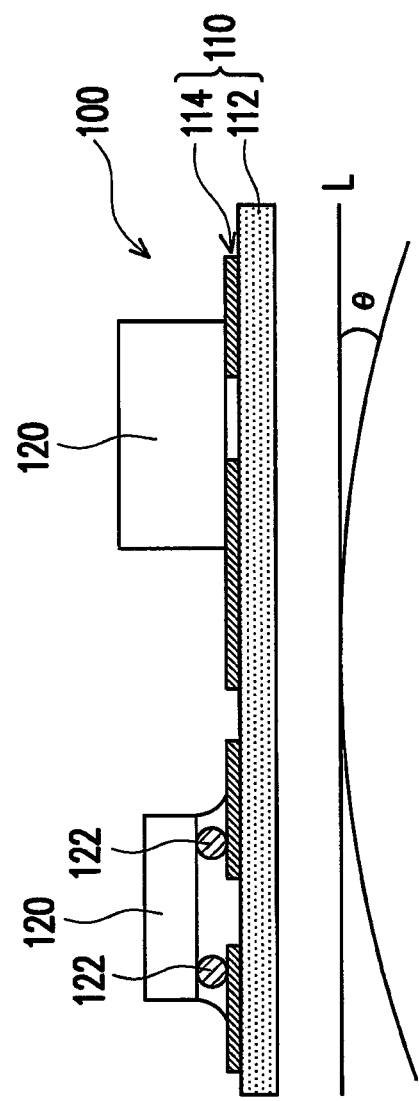
FIG. 1 is a diagram of a flexible electronic assembly according to a first embodiment of the disclosure.

FIG. 1 is a diagram of a flexible electronic assembly according to a first embodiment of the disclosure. Referring to FIG. 1, the flexible electronic assembly 100 includes a flexible circuit board 110 and at least one electronic component 120. The flexible circuit board 110 includes a dielectric film layer 112 and a patterned conductive layer 114 disposed on the dielectric film layer 112. The electronic components 120 are disposed on the flexible circuit board 110 and electrically connected to the flexible circuit board 110, and the flexible angle θ of the flexible electronic assembly 100 is greater than 5 degrees. It should be noted that the flexible angle θ refers to the tangent angle formed by the curved flexible circuit board 110 with a horizontal line L tangent to the curved flexible circuit board 110. Besides, the value of the flexible angle θ of the flexible electronic assembly 100 is determined according to the material of the flexible circuit board 110 and the sizes of the electronic components 120 thereon. For example, the smaller the sizes of the electronic components 120 are, the larger the curving extent of the flexible electronic assembly is.

In the embodiment, the material of the dielectric film layer 112 may be polyimide, glass epoxy resin, polyester, or bis-maleimide-triazine resin (i.e. BT resin), and the electronic components 120 may be disposed on the patterned conductive layer 114. Besides, one of the electronic components 120 may be a logic control component or a driving component. The electronic component 120 may be a chip or a chip package. The other one of the electronic components 120 may be a light emitting diode chip, a chip having photodiode, or a chip package containing one of the foregoing chips.

In specific, the electronic components 120 can be the components for forming a flexible display, such as flexible liquid crystal display (LCD). The electronic components 120 can be electrically connected to the patterned conductive layer 114 through flip chip bonding technology, tape automated bonding technology, or surface mounting technology. For example, one of the electronic components 120 may be a chip and has a plurality of bumps 122, and the said electronic component 120 is electrically connected to the patterned conductive layer 114 through the bumps 122. The said electronic component 120 is usually electrically connected to the patterned conductive layer 114 through flip chip bonding technology if the material of the bumps 122 of the said electronic component 120 is tin, lead, or tin-lead alloy, while the said electronic component 120 is usually electrically connected to the patterned conductive layer 114 through tape automated bonding technology if the material of the bumps 122 is gold.

Furthermore, if one of the electronic components 120 is a chip package, the said electronic component 120 can be electrically connected to the patterned conductive layer 114 through solder paste (not shown). In other words, the said electronic component 120 is electrically connected to the patterned conductive layer 114 through surface mounting technology. It should be noted that the electronic components 120 (of enough number) of the flexible electronic assembly 100 may be electrically connected to the flexible circuit board 110 through any one, two, or three of the aforementioned technologies.

In order to display image with 3D visual effect, the lenticular lens plate is usually used to deflect the image light to the two eyes, respectively, to form the 3D effect. However, the lenticular lens plate is not the only choice. Before describing the 3D image display, an adjustable liquid crystal (LC) light deflecting unit is disclosed. The adjustable LC light deflecting unit can be generally as a light deflecting unit.

Figure 2:
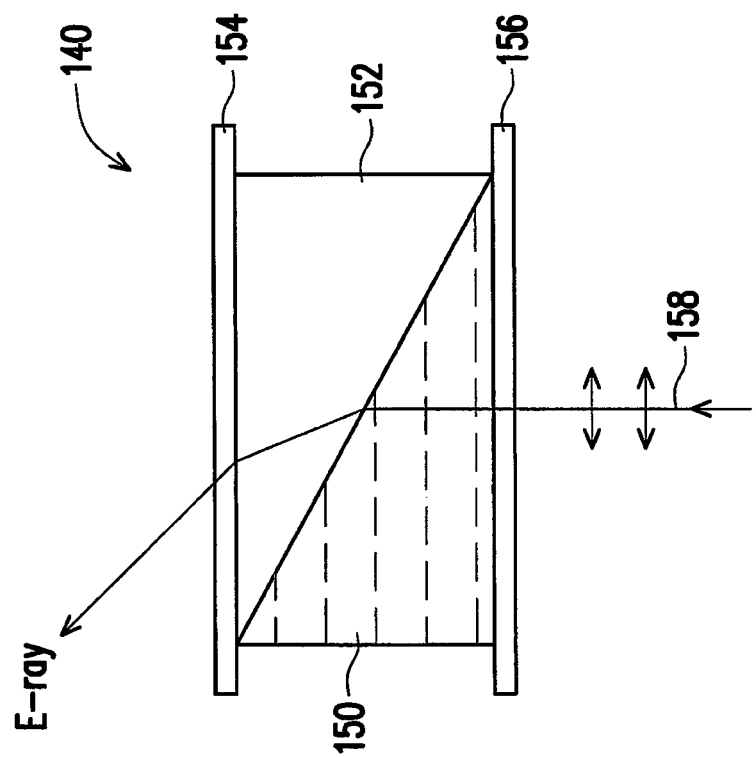
FIG. 2 is a performance of a liquid crystal light deflecting unit without bias, according to an embodiment of disclosure.

FIG. 2 is a performance of a liquid crystal light deflecting unit without bias, according to an embodiment of disclosure. Taking the LC light deflecting unit 140 as an example to serve like lenticular lens, it includes a light deflecting layer sandwiched by two transparent electrode layers 154, 158. The light deflecting layer is composed of a liquid crystal (LC) layer 150 with index of refraction $n_{LC}$ and a transparent material layer 152 with index of refraction n. The transparent material layer 152 and the liquid crystal layer 150 are in prism structure and have a slant interface. A bias can be applied to the liquid crystal layer 150 by applying voltages to the bottom electrode layer 156 and the top electrode layer 154, so as to change the aligning direction of the liquid crystal and then the index of refraction $n_{LC}$ can be changed. In the example that the bias is not applied, the direction of the long axis of liquid crystal in the liquid crystal layer 150 is about at the horizontal direction and the index of refraction $n_{LC}$ is represented as $n_e$, with a condition of n<$n_e$. In an example, when the incident light 158 with a polarization parallel to the long axis of liquid crystal, the light is deflected to left according to the Snell's law. This is also known as the E-ray.

Here, the liquid crystal layer 150 is just an example. The liquid crystal layer 150 can be an anisotropic material of which the optical axis can be controlled. Even further, the transparent material layer 152 can also be other anisotropic material of which the optical axis can be controlled as well.

Figure 3:
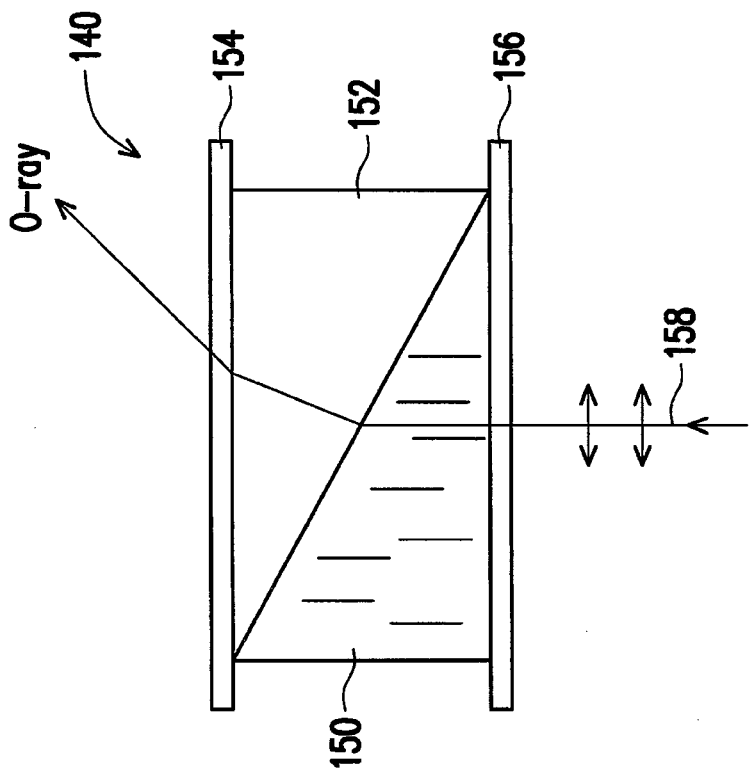
FIG. 3 is a performance of a liquid crystal light deflecting unit with bias, according to an embodiment of disclosure.

FIG. 3 is a performance of a liquid crystal light deflecting unit with bias, according to an embodiment of disclosure. In FIG. 3, when a bias is applied to the liquid crystal layer 150 by applying a ground voltage to the bottom electrode layer 156 and applying a positive voltage to the top electrode layer 154, the liquid crystal are rotated to be vertical aligning direction and the index of refraction $n_{LC}$ is changed to $n_o$, greater than the index of refraction n of the transparent material layer 152. In this situation, when the incident light with transverse polarization vertically enters the liquid crystal layer 150, the light is deflected toward the right side, according to the Snell's law. This also known as the O-ray.

Figure 4:
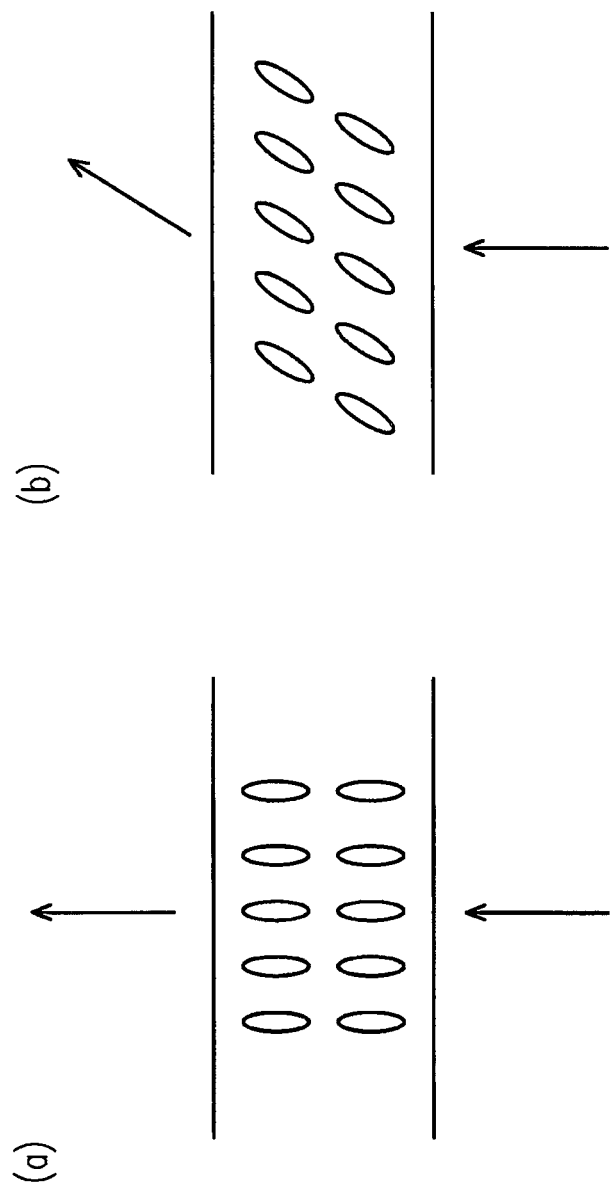
FIG. 4 is a drawing, schematically illustrating the deflection mechanism from the LC, according an embodiment of disclosure.

Based on the adjustable change of the index of refraction of liquid crystal layer 150, the incident light can be deflected to the other expected direction under control. As a result, the function like the lenticular lens can be achieved. Additionally, the aligning direction of liquid crystal under control may result in the effect of deflecting the incident light. FIG. 4 is a drawing, schematically illustrating the deflection mechanism from the LC, according an embodiment of disclosure. In FIG. 4a, for example, the light being vertically incident to the LC light deflecting unit is not deflected at the output end when the liquid crystal is aligned to the light incident direction. Alternatively, for example in FIG. 4b, when the bias is applied between the electrode layers, the liquid crystal are rotated to a controlled direction with the change of index of refraction, the incident light is defected to other direction. In other words, based on the property of controllable index of refraction and the aligning direction of the liquid LC, in association with another transparent layer, the incident light can be deflected to the determined direction.

Figure 5:
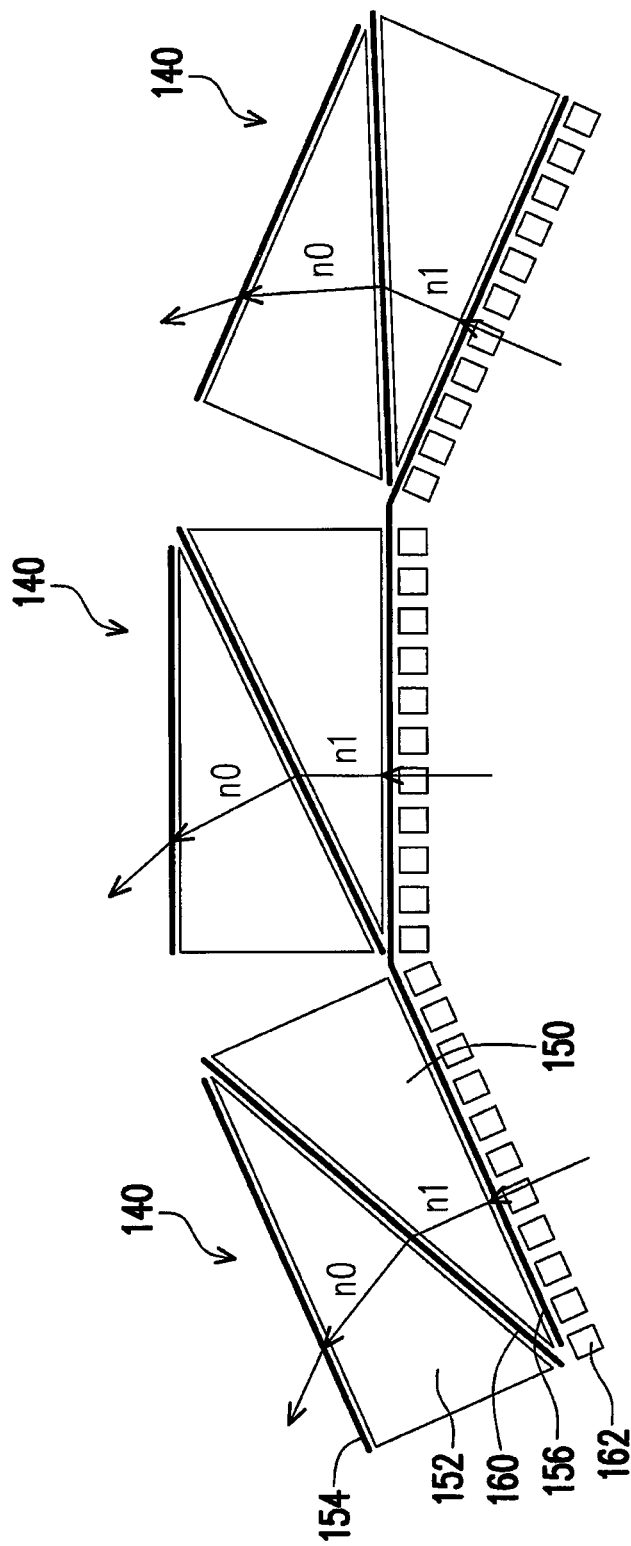
FIG. 5 is a cross-sectional drawing, schematically illustrating a light deflecting device, according to an embodiment of disclosure.

FIG. 5 is a cross-sectional drawing, schematically illustrating a light deflecting device, according to an embodiment of disclosure. In FIG. 5, three LC light deflecting units 140 are shown as an example. Based on technology of flexible assembly, a flexible light deflecting device can be fabricated with multiple LC light deflecting units 140 as the columnar structure on the substrate, such as a flexible substrate or a rigid substrate. The LC light deflecting units 140 can be implemented with the light source 162. The light source 162 can be formed by multiple light emitting devices in this example. It can be understood that each light defecting unit 140 is a columnar structure, extending along a vertical line of a displayed image in a practical application. In this example, each LC light deflecting unit 140 has a bottom electrode layer 156 and a top electrode layer 154.

A controllable light-deflecting layer is sandwiched between the two electrode layers 154, 156. The controllable light-deflecting layer is composed of a transparent material layer 152 with index of refraction $n_0$ and a liquid crystal layer 150 with controllable index of refraction $n_1$, in which n1 can be adjusted to be less or greater than $n_0$. The transparent material layer 152 and the liquid crystal layer 150 can have a slant interface. In an example, the transparent material layer 152 and the liquid crystal layer 150 are the prism structures. A separator 160 may be also implemented at the interface. The transparent material layer 152 may be, for example, a solid material or another kind of LC without specifically limited to the example. Also, the liquid crystal layer 150 can also be any material with controllable index of refraction without specifically limited to example. In addition, the stack sequence of the transparent material layer 152 and the liquid crystal layer 150 can also be changed in option.

The optical property is that the index of refraction can be adjusted by applying proper bias between the two electrode layers, so that the incident light can be deflected as adjusted. In this example, the bottom electrode layer 156 can be the ground voltage layer and can be commonly connected together in flexible shape. In this example, the light source 162 can be formed from the light-emitting devices over the bottom electrode layer 156, so that the emitted light is directly entering the LC light deflecting units 140. By applying a proper operation voltage individually on each of the top electrode layers in association with the geometric structure, the output lights can be deflected to the determined directions. In one application on 3D display, the output lights of the LC light deflecting units 140 are deflected into a direction at a time period. In next time period, the output lights of the LC light deflecting units 140 are deflected into another direction, for another viewing zone.

Figure 6:
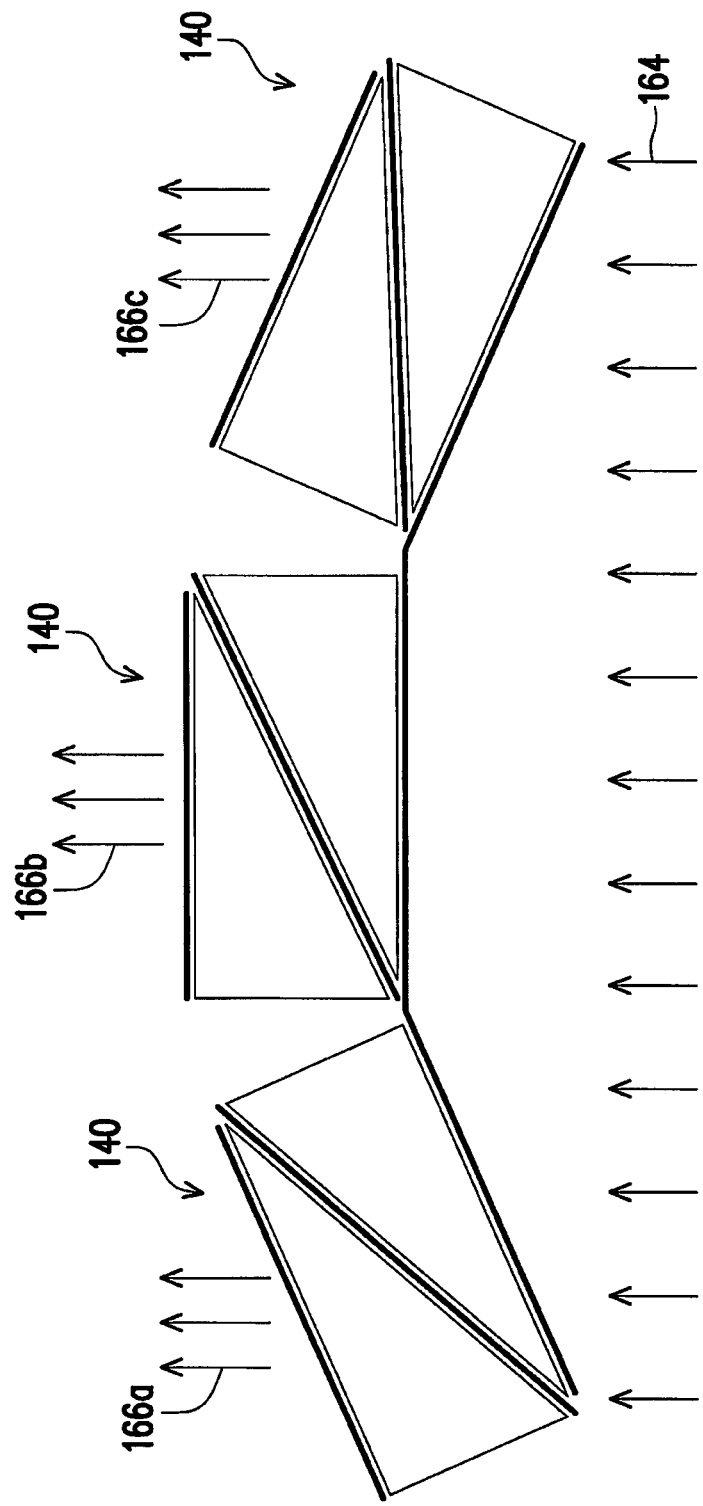
FIG. 6 is a cross-sectional drawing, schematically illustrating another light deflecting device, according to an embodiment of disclosure.

FIG. 6 is a cross-sectional drawing, schematically illustrating another light deflecting device, according to an embodiment of disclosure. The light source 164 can have other choice. In this example, the light source 164 is provided by external collimated light. In this structure, the incident light source 154 onto the LC light deflecting units 140 is not vertical. However, with the proper setting of the geometrical locations and the operation bias, the function of deflecting lights 166a, 166b, 166c into the intended directions can also be achieved.

Figure 7:
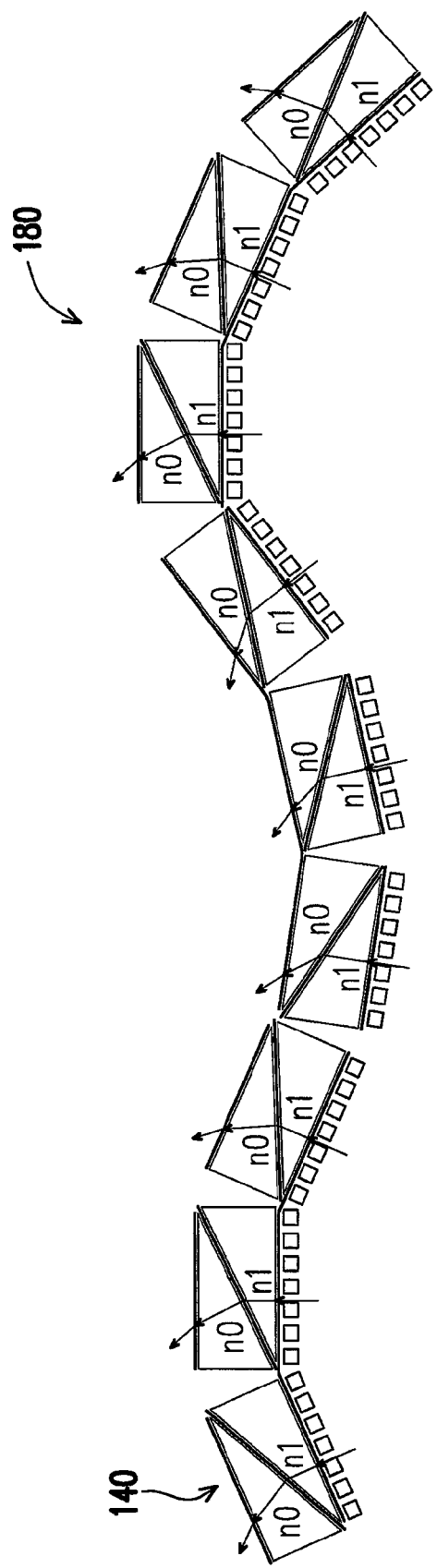
FIG. 7 is a cross-sectional drawing, schematically illustrating another light deflecting device with more LC light deflecting units, according to an embodiment of disclosure.

FIG. 7 is a cross-sectional drawing, schematically illustrating another light deflecting device with more LC light deflecting units, according to an embodiment of disclosure. In FIG. 7, several LC light deflecting units 140 can be formed as a lens array 180, being grouped corresponding to pixels so as to form multiple viewing regions when applying to 3D image display. Due to the flexible property, the viewing regions can be easily set up in the space for naked eyes to view 3D image. In temporal multiplexed mechanism for 3D display, several viewing zones corresponding to different viewing angles of same landscape are to be display by a time sequence. The LC light deflecting units 140 can be controlled to respectively deflect the 2D images of viewing zones into viewing directions by the same time sequence. The two eyes of a viewer at different viewing direction to view the left image and the right image of two different viewing zones. As a result, due to the parallax between the two viewing zones, a 3D visual effect can be created in the human visual system. The mechanism for 3D image display is to be described later in detail.

Figure 8A:
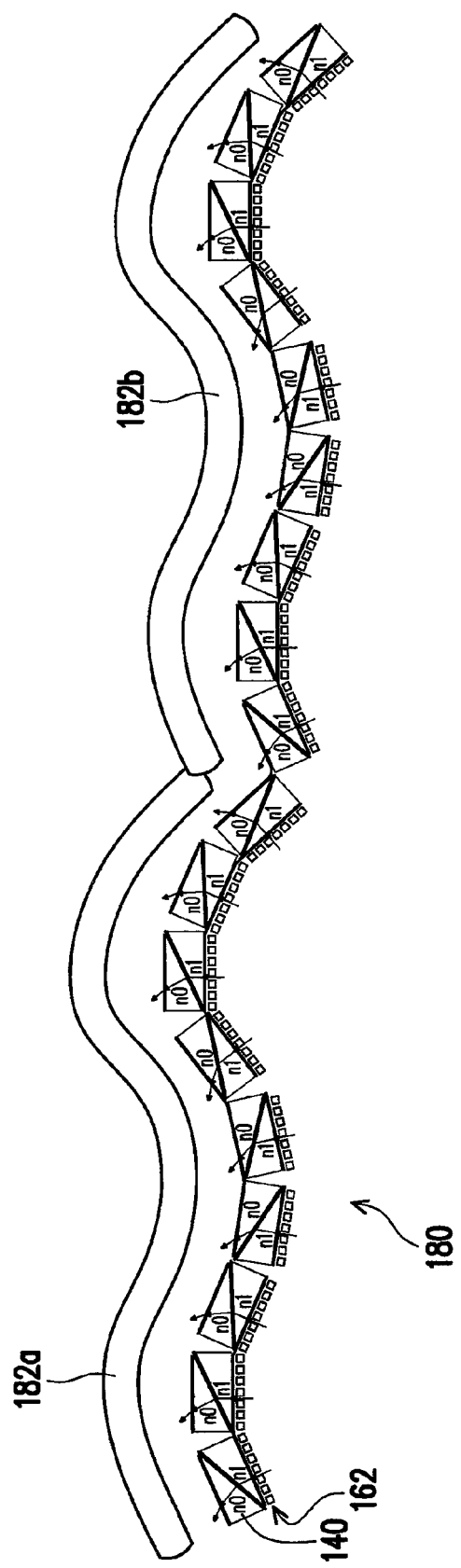
FIG. 8A is a cross-sectional drawing, schematically illustrating pixel structure with multiple viewing zones according to an embodiment of disclosure.

FIG. 8A is a cross-sectional drawing, schematically illustrating pixel structure with multiple viewing zones according to an embodiment of disclosure. In FIG. 8A, the lens array 180 is implemented behind the pixels 182a, 182b of a flexible display panel. Here, only two pixels 182a, 182b are presented as the example. In this example, one pixel may be implemented with nine LC light deflecting units 140. The light source 162 may provide light just behind the LC light deflecting units 140. All of the LC light deflecting units 140 are adjusted to have the same light emitting direction, corresponding to the viewing zones. However, the light emitting direction is changed by time sequence, corresponding to the time sequence of display, so that images with parallax of multiple viewing zones are sequentially project to different viewing directions for view by two eyes of a viewer at different time. Since the two eyes receive the two images at two viewing zones and form the 3D visual effect.

Figure 8B:
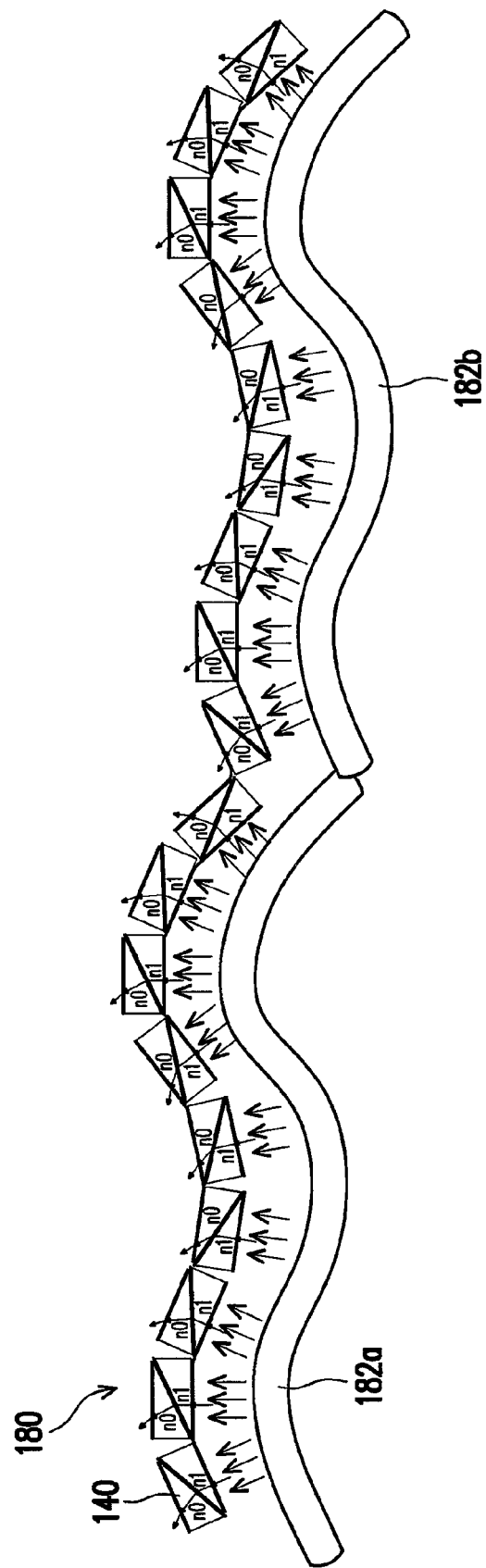
FIG. 8B is a cross-sectional drawing, schematically illustrating pixel structure with multiple viewing zones according to an embodiment of disclosure.

It can be noted that the flexible display panel in this example of FIG. 8A, such as the LCD display panel, needs the back light. Alternatively, if the flexible display panel is the type to actively emit image light, such as LED display panel, the lens array 180 is disposed in front of the pixels of the display panel. FIG. 8B is a cross-sectional drawing, schematically illustrating pixel structure with multiple viewing zones according to an embodiment of disclosure. In FIG. 8B, the pixels 182a, 182b are disposed behind the lens array 180 to actively emit the image light. The lens array 180 in this example does not need the light source 162.

Figure 9A:
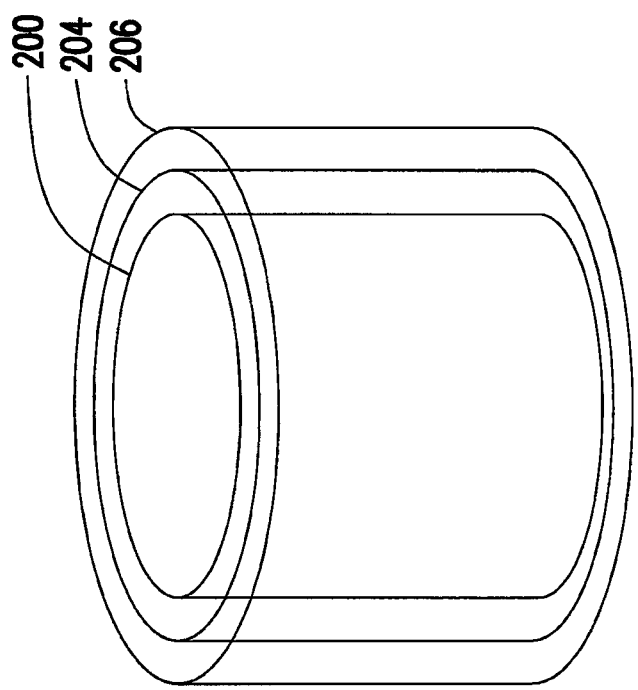
FIG. 9A is a drawing, schematically illustrating a mechanism for 3D image display, according to an embodiment of the disclosure.

To have the 3D image display for multiple viewers to view individual 3D content at different portion of the landscape, the flexible display panel can be set as a round geometric structure in an example. FIG. 9A is a drawing, schematically illustrating a mechanism for 3D image display, according to an embodiment of the disclosure. In FIG. 9A, a light source 200 with the flexible property is assembled as the round geometric structure. A lens array 204 with the flexible property is also set as a round geometric structure to deflect the light source 200 into multiple viewing zones in a time sequence. The round display panel 206 is then receives the light source 200 with multiple viewing zones to display the images according to temporal multiplexed mechanism. The mechanism for 3D image display is described in subsequent embodiments. The light source 200 and the lens array 204 can be formed together as an active barrier dynamic backlight slit assembler in an integrated unit.

FIG. 9B is a drawing, schematically illustrating a mechanism for 3D image display, according to an embodiment of the disclosure. In FIG. 9B, if the display panel 210 is actively emitting the image light, with the same concept, the lens array 204 is disposed as an outer layer, so that the image light can be deflected and enter the multiple viewing zones for the two eyes of each viewer, respectively.

Based on the example in FIG. 9A, multiple viewers can view the 3D image display with different contents at different display regions of the round display panel 206. Taking four viewing zones as an example to be created, each viewing zone occupies 1/240 second for display one 2D image. One eye receives the first image in 1/240 second at one viewing zone and another eye receives another image in next 1/240 second at the adjacent viewing zone. This is within the acceptable range of the human visual system to compose the 3D effect without causing image blinking. The detail is described in FIG. 10.

Figure 10:
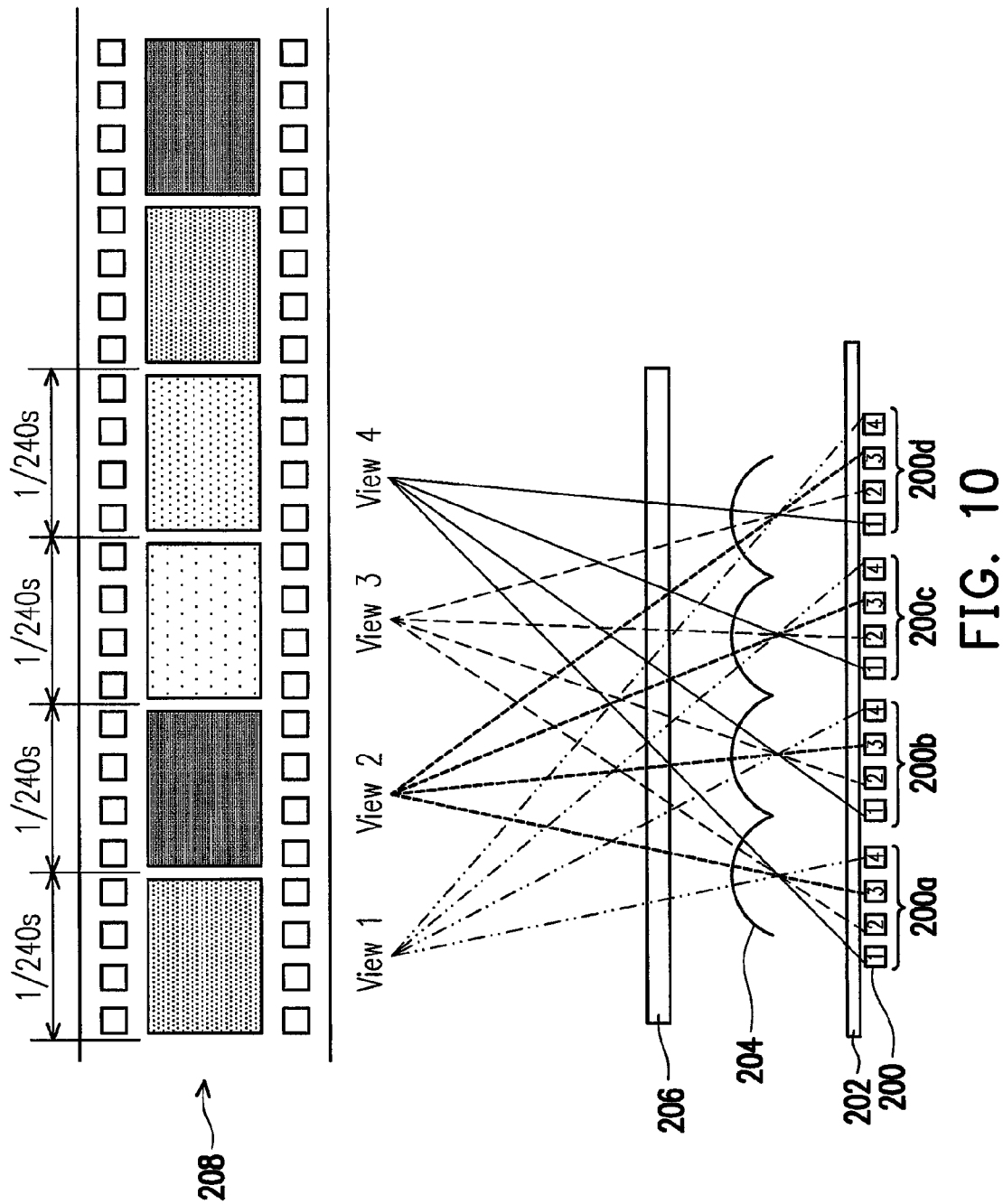
FIG. 10 is a cross-sectional drawing, schematically illustrating a display structure for 3D image display based on lenticular lens array, according to an embodiment of the disclosure.

FIG. 10 is a cross-sectional drawing, schematically illustrating a display structure for 3D image display based on lenticular lens array, according to an embodiment of the disclosure. In FIG. 10, the embodiment is illustrated for four viewing zones 1-4 located at the viewing location 208. Each viewing zone uses 1/240 second to display one image. In this example, the light source 200 at specific location is grouped corresponding to each lenticular lens of the lenticular lens array 204. For the four viewing zones, each lenticular lens has four groups 1-4 of light sources corresponding to four viewing zones 1-4. The four groups of light are sequentially turned on for 1/240 second. For example, the group 1 of light source 200 is turned on, and then the group 2 of light source 200 is turned on next for 1/240 second. Likewise, the groups 3 and 4 of light source 200 are sequentially turned on for 1/240 second. Generally, the multiple viewing zones equally shares 1/60 second for one image frame. In addition, a uni-direction diffusion lens plate 202 can be used with the light source 200 to improve the light emitting direction to form the active barrier. The uni-direction diffusion lens plate 202 can condense the light individually belonging to each the lenticular lens at transverse direction.

It can be understood that the flexible property has the advantage for bending the display into the geometric structure. However, the flexible property may also be set as a flat structure. According to the need, the flexible property can be replaced by a rigid flat structure. In other words, the provided embodiments as described in the disclosure can also be applied to a rigid flat display.

The lenticular lenses of the lens array 204 receive the light and deflect the light into each viewing zone in a time sequence, respectively. The display panel 206 displays the corresponding images of the four viewing zones by the same time sequence according to temporal multiplexed mechanism. Further descriptions about the 3D image display mechanism will be provided later in FIG. 12.

Figure 11:
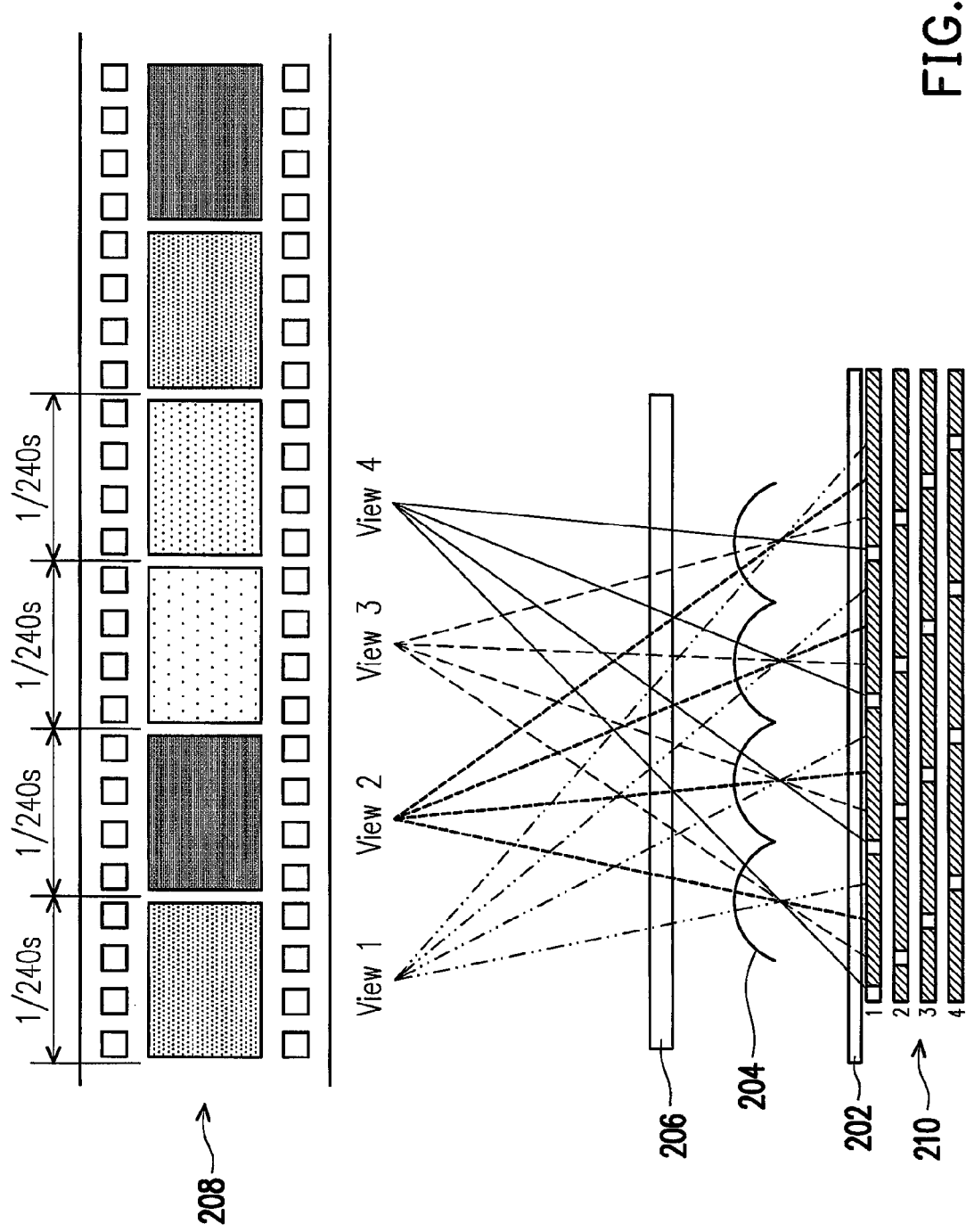
FIG. 11 is a drawing, schematically illustrating a time sequence for turning on the four groups of the light source, according to an embodiment of the disclosure.

The light source 200 is divided into four groups, which are turned on sequentially, and then a displaying rate of 60 Hz for displaying 3D image still maintain. FIG. 11 is a drawing, schematically illustrating a time sequence for turning on the four groups of the light source, according to an embodiment of the disclosure. In FIG. 11, the time sequence for turning on the four groups of the light source 200. When the group 1 of the light source is turned on, represented by white region, the other groups 2-4 are turned off. At this moment, only the viewing zone (view 4) corresponding to one eye can be viewed. When the group 2 is turned on and groups 1, 3-4 are turned off, only the viewing zone (view 3) can be viewed at another eye. The display panel 206 correspondingly displays the images with a period of 1/240 second four different viewing zones. Likewise, the group 2, group 3, and group 4 are sequentially turned on for viewing zones 3, 2 and 1. Four viewing zones can be created.

Figure 12:
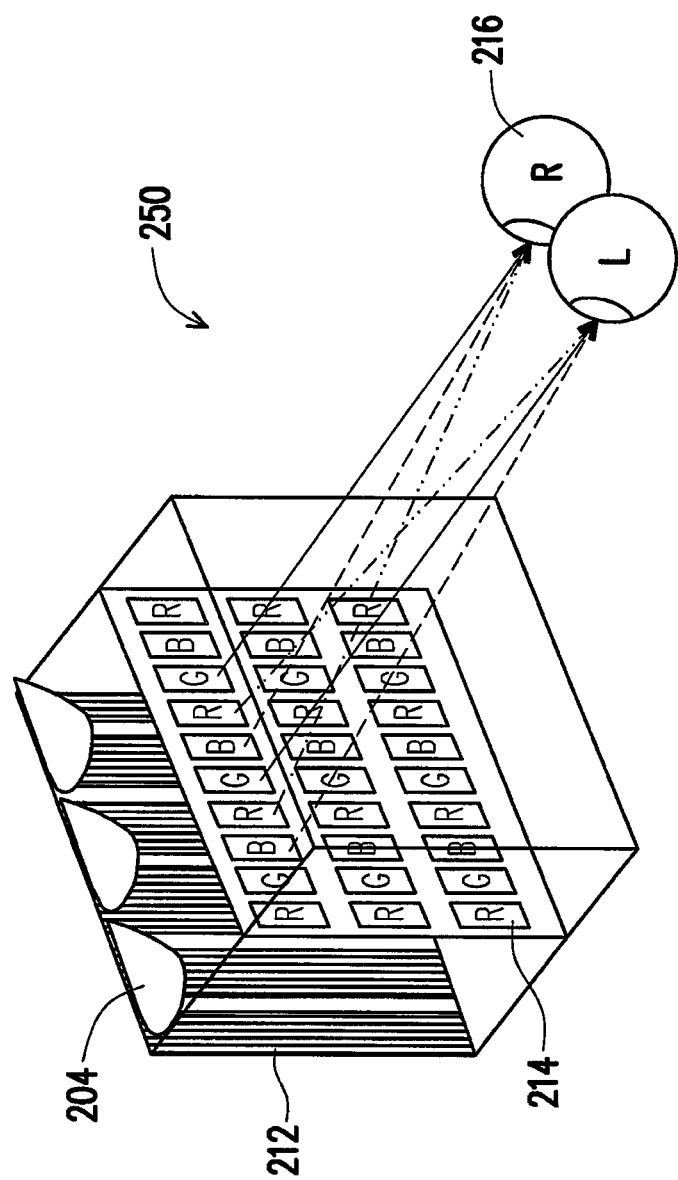
FIG. 12 is perspective drawing, schematically illustrating the 3D image display mechanism, according to an embodiment of the disclosure.

FIG. 12 is perspective drawing, schematically illustrating the 3D image display mechanism, according to an embodiment of the disclosure. In FIG. 12, for one viewer 216, the lenticular lens array 204 and the active barrier 212 form as a backlight source. According to the time sequence for turning the groups of the light source, multiple viewing zones at multiple directions are created. The lights belonging to different viewing zones can enter the left eye (L) and the right eye (R) at different time period. Since the directions of light for the viewing zones are different, the two eyes do not interfere. Only one eye individually receives the image at one corresponding viewing zone at its displaying time period, such as 1/240 second. As a result, the 3D image can be created for the viewer by naked eyes.

Figure 13:
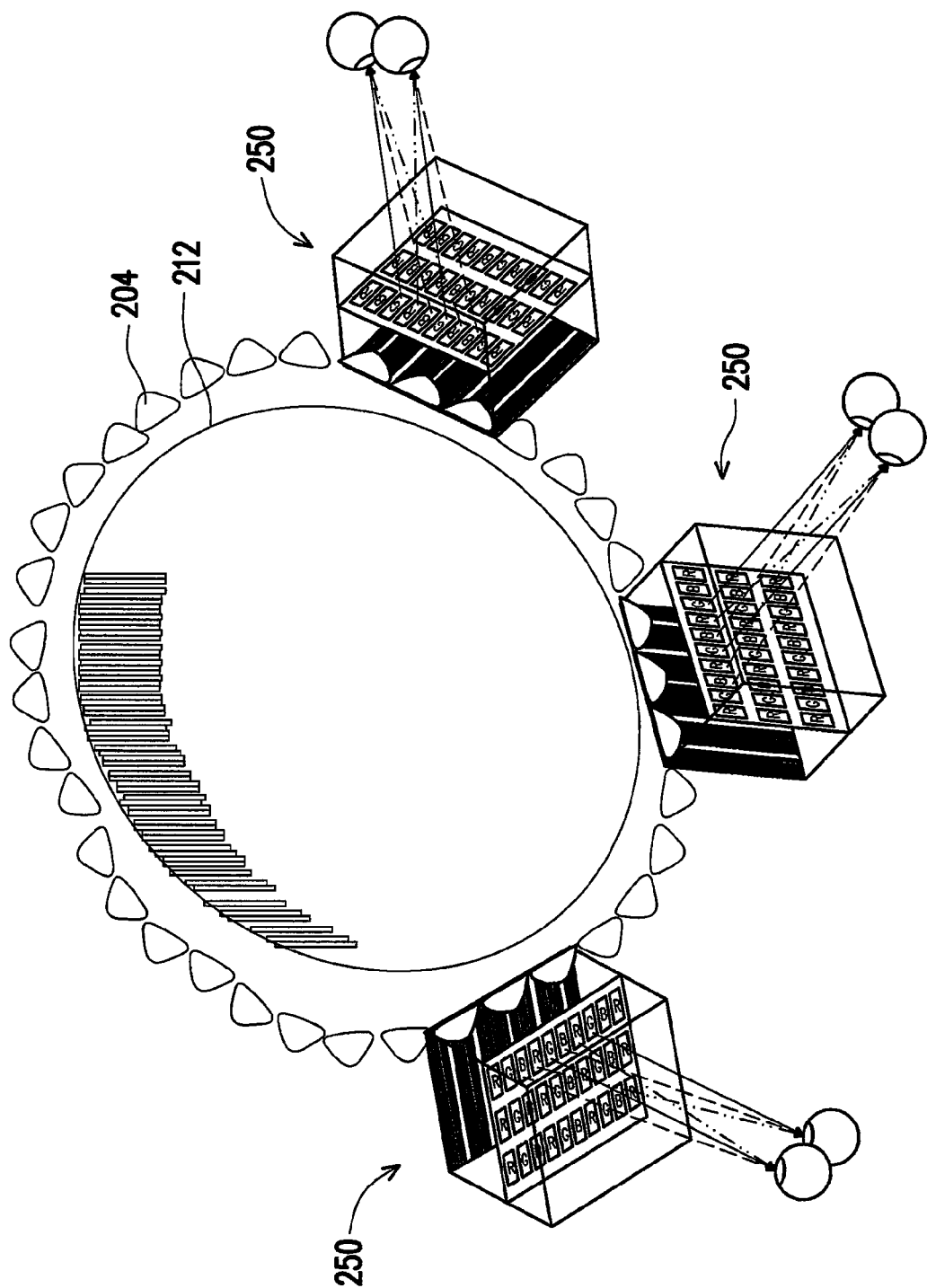
FIG. 13 is a perspective drawing, schematically illustrating multiple viewers at different viewing zones to view individual image content, according to an embodiment of the disclosure.

FIG. 13 is a perspective drawing, schematically illustrating multiple viewers at different viewing zones to view individual image content, according to an embodiment of the disclosure. In FIG. 13, based on the flexible property, the active barrier 212 is formed in a round shape to emit lights. Each light unit of the active barrier is a thin bar structure, for example. Three viewers 250 are shown at three viewing locations for different part of image to be displayed in the display panel 214. Each viewer 250 views the 3D image based on the mechanism as described in FIG. 12.

The previous embodiments for 3D image display are based on the lenticular lens array in association with the control of the backlight source. However, the lenticular lens array 204 in FIG. 12 can be replaced by the LC light deflecting units to form liquid lens array. Generally, a light deflecting lens array can be referred and can be the lenticular lens array or the liquid lens array, or any other array with the same function.

Figure 14A:
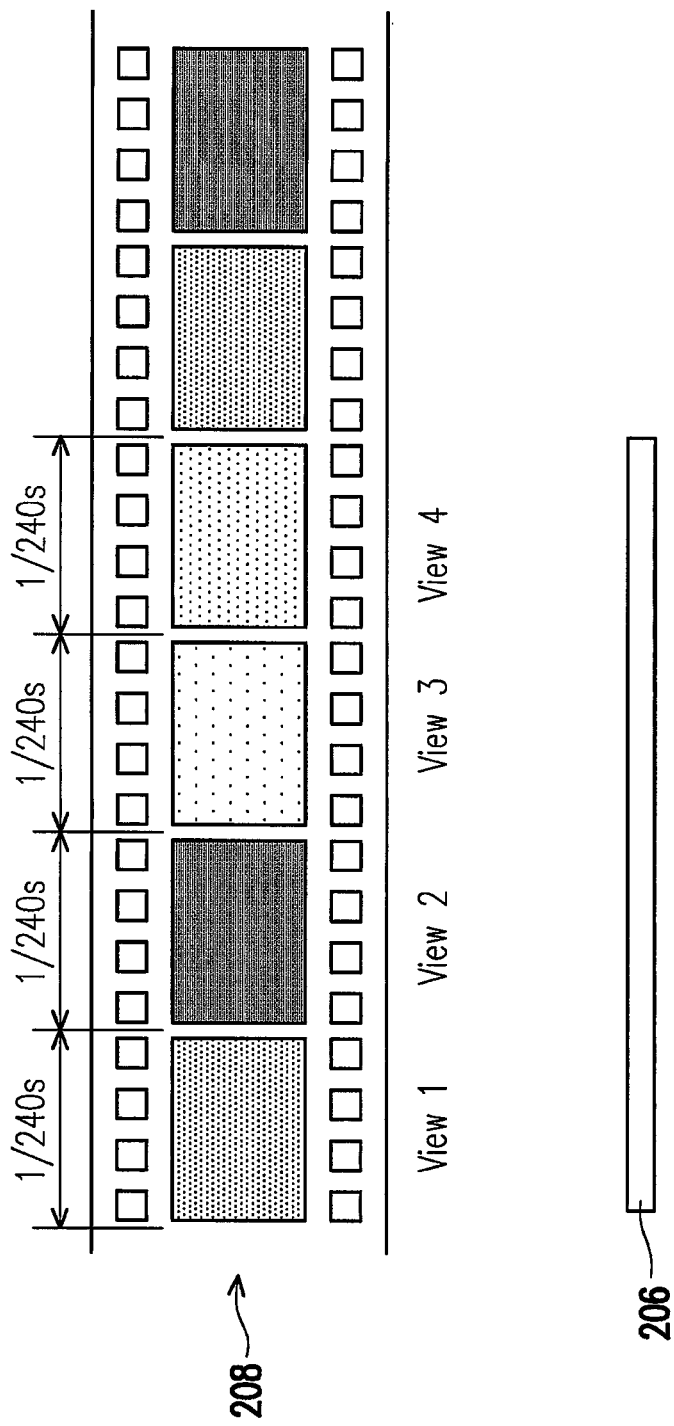
FIGS. 14A-14B are cross-sectional drawings, schematically illustrating a display structure for 3D image display based on liquid lens array, according to an embodiment of the disclosure.
Figure 14A:
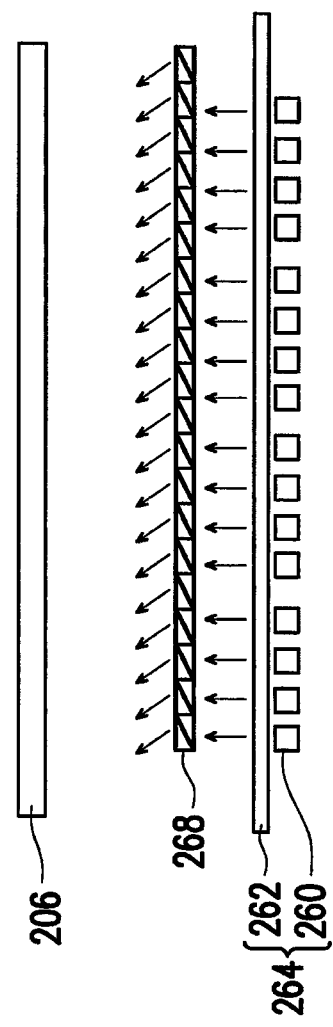
Figure 14B:
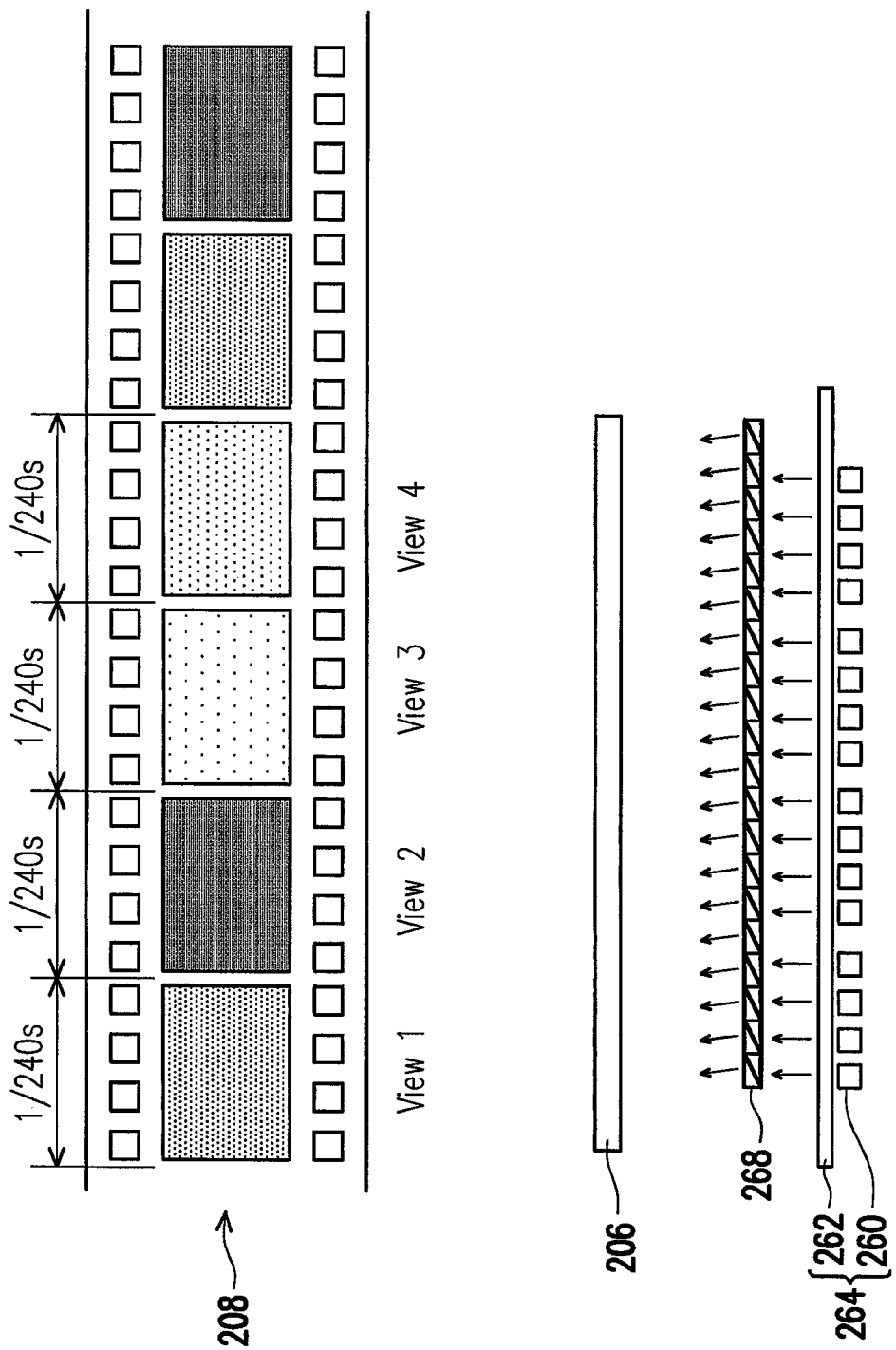

FIGS. 14A-14B are cross-sectional drawings, schematically illustrating a display structure for 3D image display based on liquid lens array, according to an embodiment of the disclosure. In FIG. 14A, the active barrier 264 as the backlight source includes the light source 260 and the uni-direction diffusion lens plate 262. In this embodiment, all of the light source may be turned on/off without grouped. For example, the collimated light source is produced. Each of the LC light deflecting units of the liquid lens array 268 can be controlled to deflect the incident light to a set direction, corresponding to one of the viewing zones by a time sequence. For example In FIG. 14A, the LC light deflecting units of the liquid lens array 268 are adjusted to emit light toward the viewing zone (view 1) at a time period, such 1/240 second. In FIG. 14B, the LC light deflecting units of the liquid lens array 268 are adjusted to emit light toward the next viewing zone (view 2) at the next time period, such 1/240 second. The flexible display panel 206 sequentially displays the images of the viewing zones. When the left-eye image and the right-eye image at the viewing location 208 separately view the images at two adjacent viewing zones, a 3D image can be created for the corresponding viewer. The display mechanism is like the mechanism for lenticular lens in FIG. 10.

Figure 15:
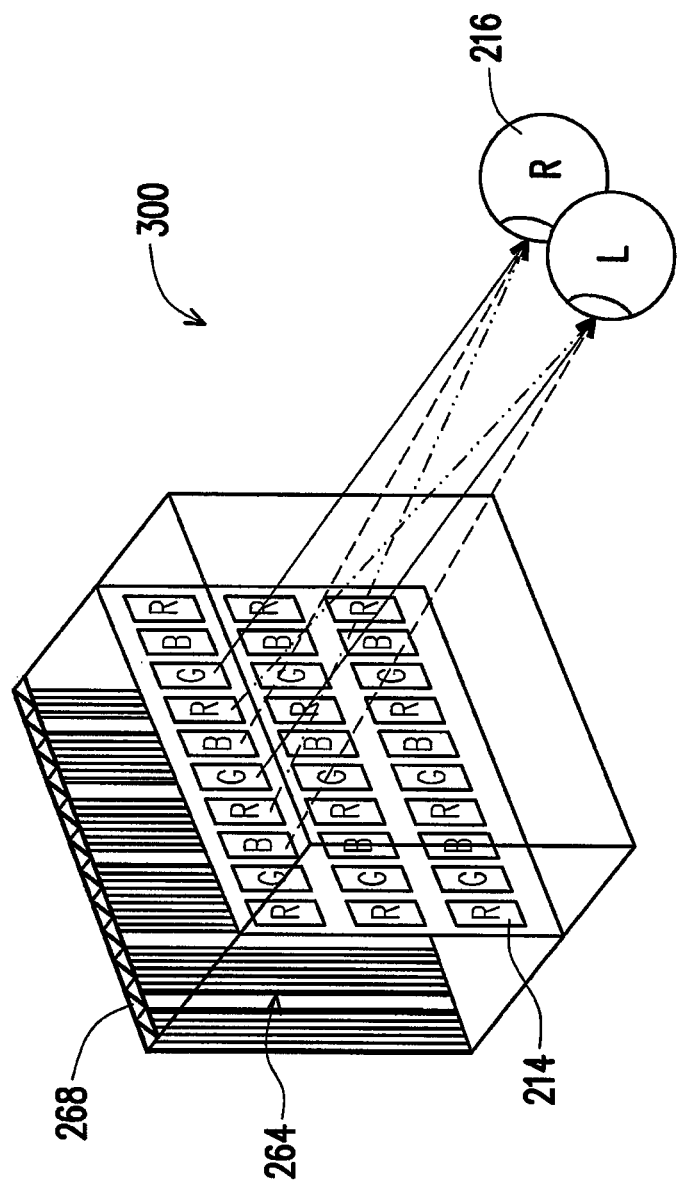
FIG. 15 is perspective drawing, schematically illustrating the 3D image display mechanism, according to an embodiment of the disclosure.

FIG. 15 is perspective drawing, schematically illustrating the 3D image display mechanism, according to an embodiment of the disclosure. In FIG. 15, for one viewing location 300, the liquid lens array 268 and the active barrier 264 form as a backlight source. The emitted light in each LC light deflecting unit of the liquid lens array 268 respectively passes the flexible display panel 214 and then enters the left eye (L) and right eye (R) in a time sequence. The left-eye image and the right-eye image are sequentially display in the flexible display panel 214 and sequentially enter the two eyes to form a 3D image.

Figure 16:
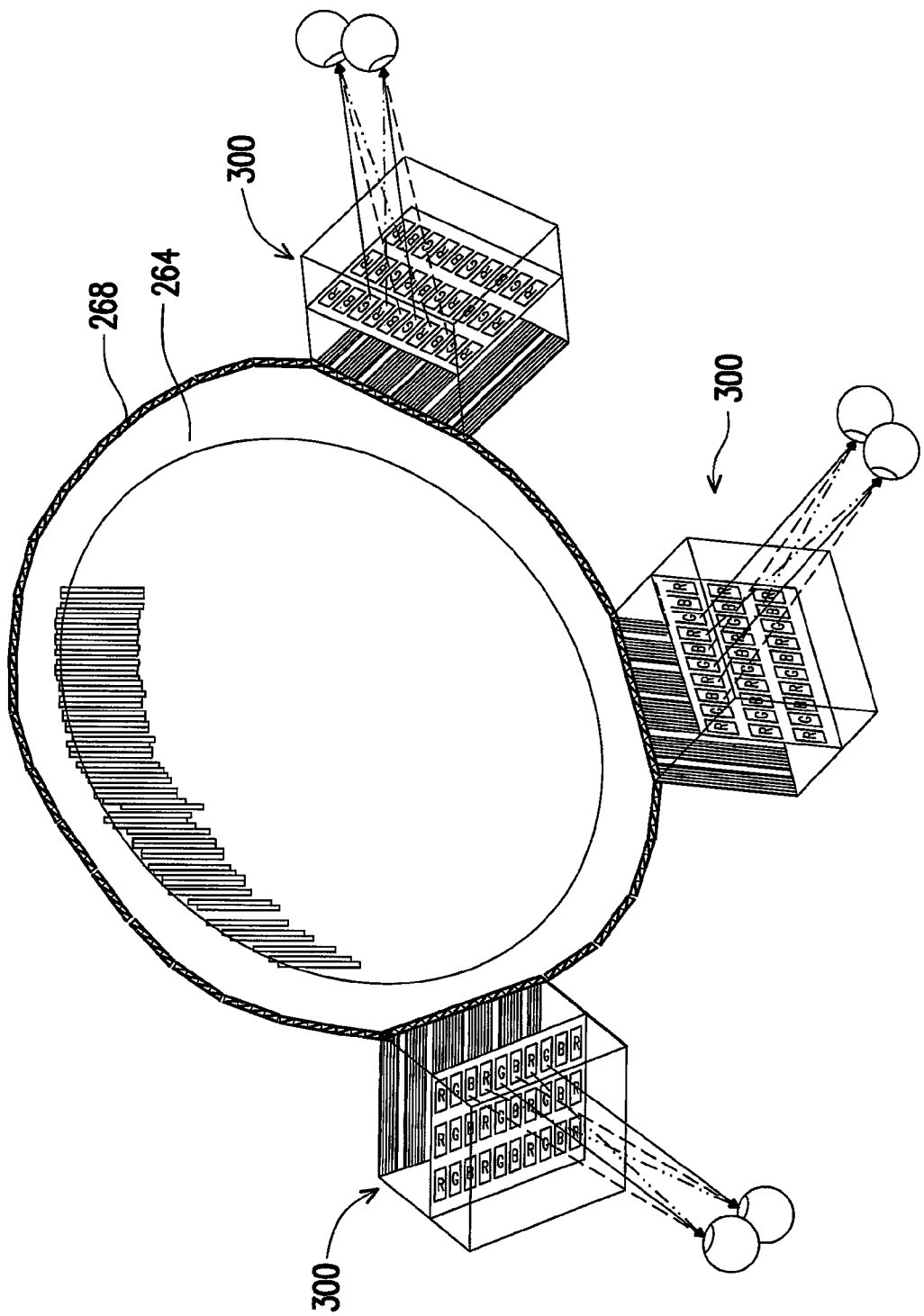
FIG. 16 is a perspective drawing, schematically illustrating multiple viewers at different viewing zones to view individual image content, according to an embodiment of the disclosure.

FIG. 16 is a perspective drawing, schematically illustrating multiple viewers at different viewing zones to view individual image content, according to an embodiment of the disclosure. In FIG. 16, based on the flexible property, the active barrier as the 264 is formed in a round shape to emit lights. Each light unit is a thin bar structure. Three viewing locations 300 are shown at three viewing zones. A viewer at each viewing location 300 views the 3D image with naked eyes based on the mechanism as described in FIG. 15. However, different viewing location 300 views different part of the flexible display panel 214. For the example of three viewers, they can be located at different viewing locations 300. The flexible display panel 214 displays the 3D images for multiple viewers.

It can be understood that if the display panel 214 displays different contents at the different viewing locations, multiple viewers can separately view different image objects. This is also one of practical applications.

Even further, the previous embodiments for the 3D image display are based on the flexible display panel in light transmission type. The product of LCD panel is more popular in the current market. However, as described in FIGS. 8B and 9B, the LED display panel is also developed and can actively emit the image light. In this situation, the location of the display panel is behind the lens array, so as to deflect the image light to both eyes with left-eye image and right-eye image.

Even further, because the light deflection of the LC light deflecting unit can be dynamically adjusted, when the viewer is moving viewing location/angle, the image content can be dynamically tracking the viewer. In this mechanism, an additional viewer tracker can be implemented to detect the location of the viewer based on the technology of state-in-the-art without limitation.

Figure 17:
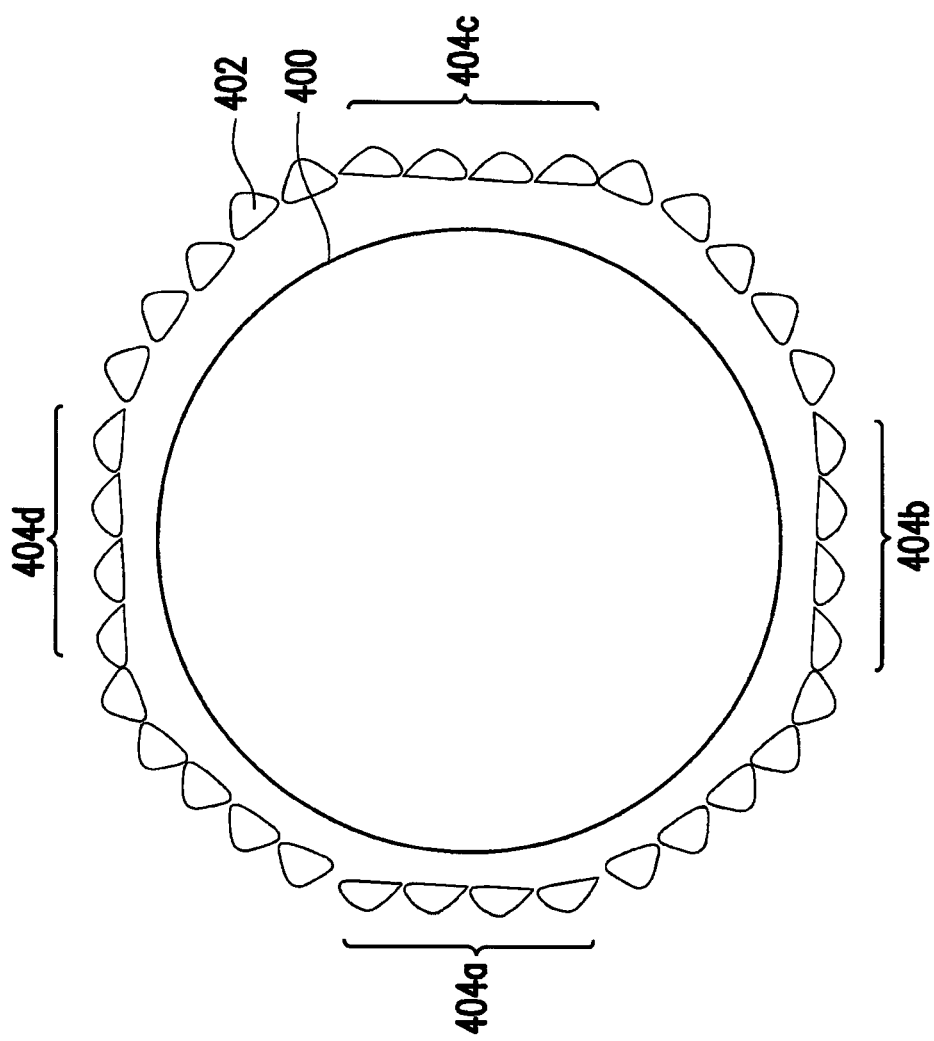
FIG. 17 is a perspective view, schematically illustrating the 3D image display mechanism, according to an embodiment of the disclosure.

FIG. 17 is a perspective view, schematically illustrating the 3D image display mechanism, according to an embodiment of the disclosure. In FIG. 17, the flexible display panel 400 with actively emitting image light is formed in a round shape as an example. The flexible display panel 400 can emit image lights by time sequence. The lenticular lens array 402 is disposed outer the flexible display panel 400. Four viewers 404a-404d, as an example, can respectively view 3D image at the corresponding viewing locations.

Figure 18:
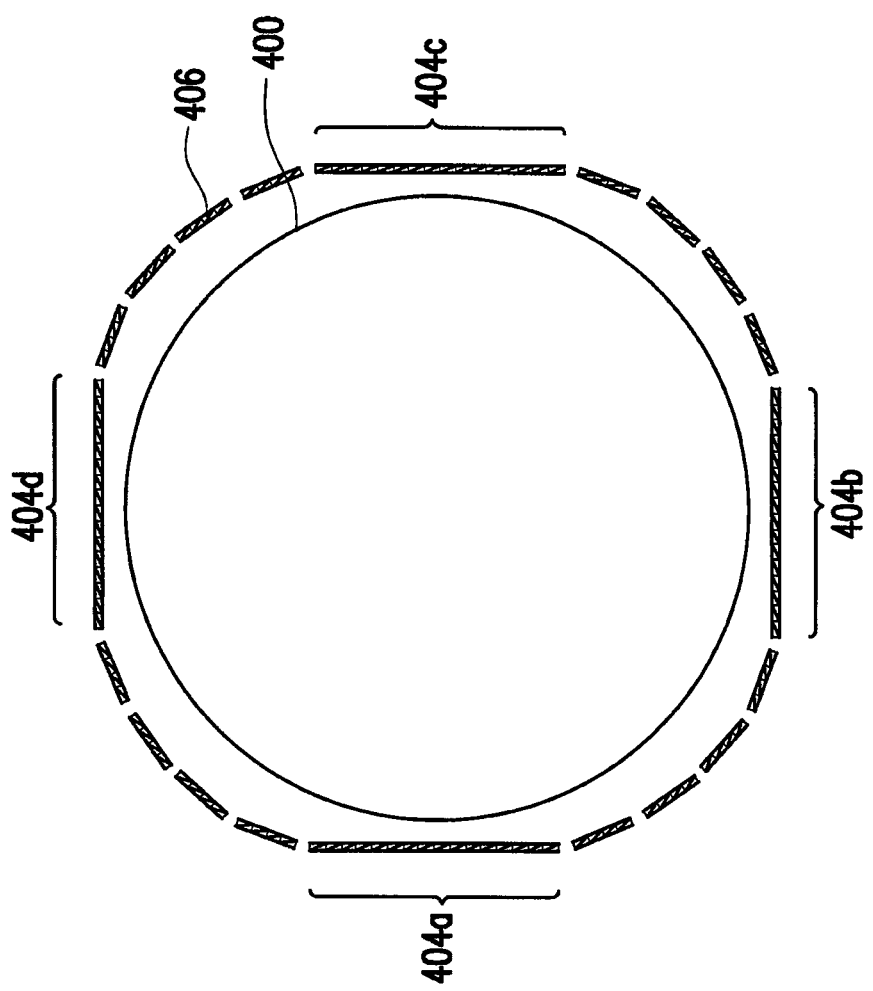
FIG. 18 is a perspective view, schematically illustrating the 3D image display mechanism, according to an embodiment of the disclosure.

FIG. 18 is a perspective view, schematically illustrating the 3D image display mechanism, according to an embodiment of the disclosure. In FIG. 18, the flexible display panel 400 with actively emitting image light is formed in a round shape as an example. The flexible display panel 400 can emit image light in a time sequence. The liquid lens array 406 is disposed outer the flexible display panel 400. Four viewers 404a-404d, as an example, can respectively view 3D image at the corresponding viewing locations.

In general, the lens array can be disposed in any proper location between the light source and the viewer, in which the light source may be just the backlight or the image light carrying the color information from the display panel. The flexible lens array deflects the pixel lights of the left-eye image and right-eye image to two naked eyes of one viewer at the specific viewing zone without interfering with other viewers.

Further, as previously mentioned, the embodiments are not limited to the flexible structure and can be applied to the rigid flat display or any other proper geometric structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A 3-dimensional image display, comprising:
   a backlight source;
   a light deflecting lens array, disposed over the backlight source, wherein the light deflecting lens array has a plurality of light deflecting units, each of the light deflecting units deflects a portion of the backlight source into a plurality of viewing zones in a time sequence; and
   a display panel, to display images by the same time sequence corresponding to the viewing zones, wherein the backlight source passes through the display panel to provide the images respectively to the viewing zones.

2. The 3-dimensional image display of claim 1, wherein the light deflecting units of the light deflecting lens array are lenticular lenses, wherein the backlight source corresponding to each of the lenticular lenses are grouped into a plurality of light groups at different locations with respect to the lenticular lenses, the light groups are sequentially turned on according to the time sequence to emit light toward the viewing zones.

3. The 3-dimensional image display of claim 1, wherein each of the light deflecting units of the light deflecting lens array comprises:
   two electrode layers;
   a transparent material prism; and
   an anisotropic material prism, wherein the transparent material prism and the anisotropic material prism are sandwiched between the two electrode layer and form a slant interface, wherein an index of refraction of the anisotropic material prism is adjustable by applying a bias between the two electrode layers to deflect the backlight source toward the viewing zones.

4. The 3-dimensional image display of claim 3, wherein the anisotropic material prism is a liquid crystal prism.

5. The 3-dimensional image display of claim 3, wherein a material of the transparent material prism is also anisotropic material.

6. The 3-dimensional image display of claim 3, wherein the index of refraction of the anisotropic material prism is adjusted in range and can be greater or less than an index of refraction of the transparent material prism.

7. The 3-dimensional image display of claim 1, wherein the backlight source provides a collimated light source to the light deflecting lens array, or the back light source is attached on the light deflecting units.

8. The 3-dimensional image display of claim 1, wherein the display panel periodically and sequentially displays the images by the time sequence, wherein display periods of the viewing zones equally share a period of one image frame.

9. The 3-dimensional image display of claim 1, wherein the display panel is flexible and bent as a round shape and multiple viewing locations are set.

10. The 3-dimensional image display of claim 1, wherein the backlight source also comprises a uni-direction diffusion lens plate to condense the portion of the backlight source into a central region, respectively.

11. A 3-dimensional image display, comprising:
    a display panel to display a sequence of images with actively emitting an image light, wherein the images are corresponding to a plurality of viewing zones and sequentially displayed by a time sequence; and
    a light deflecting lens array, disposed over the display panel, wherein the light deflecting lens array has a plurality of light deflecting units, the light deflecting units sequentially deflect the image light to the corresponding viewing zones by the same time sequence.

12. The 3-dimensional image display of claim 11, wherein the light deflecting units of the light deflecting lens array are lenticular lenses.

13. The 3-dimensional image display of claim 11, wherein each of the light deflecting units of the light deflecting lens array comprises:
    two electrode layers;

a transparent material prism; and an anisotropic material prism, wherein the transparent material prism and the anisotropic material prism are sandwiched between the two electrode layer and form a slant interface, wherein an index of refraction of the anisotropic material prism is adjustable by applying a bias between the two electrode layers.

14. The 3-dimensional image display of claim 11, wherein the display panel is flexible and bent as a round shape and multiple viewing locations are set.

* * * * *